United States Patent
Cai et al.

(10) Patent No.: US 11,050,985 B2
(45) Date of Patent: Jun. 29, 2021

(54) IMAGE PURPLE FRINGE ELIMINATING SYSTEM, METHOD, COMPUTER-READABLE STORAGE MEDIUM, AND PHOTOGRAPHING DEVICE

(71) Applicant: SHENZHEN ARASHI VISION COMPANY LIMITED, Shenzhen (CN)

(72) Inventors: Jinlin Cai, Shenzhen (CN); Jingkang Liu, Shenzhen (CN)

(73) Assignee: ARASHI VISION INC., Shenzhen (CN)

(*) Notice: Subject to any disclaimer, the term of this patent is extended or adjusted under 35 U.S.C. 154(b) by 52 days.

(21) Appl. No.: 16/477,586

(22) PCT Filed: Jan. 11, 2018

(86) PCT No.: PCT/CN2018/072225
§ 371 (c)(1),
(2) Date: Jul. 12, 2019

(87) PCT Pub. No.: WO2018/130177
PCT Pub. Date: Jul. 19, 2018

(65) Prior Publication Data
US 2020/0128221 A1  Apr. 23, 2020

(30) Foreign Application Priority Data

Jan. 12, 2017  (CN) .......................... 201710022037.8

(51) Int. Cl.
*G06K 9/00* (2006.01)
*H04N 9/64* (2006.01)
*G06T 5/00* (2006.01)
(52) U.S. Cl.
CPC ............. *H04N 9/646* (2013.01); *G06T 5/009* (2013.01); *H04N 9/643* (2013.01)

(58) Field of Classification Search
CPC .... H04N 9/646; H04N 9/643; H04N 9/04517; H04N 9/045; H04N 9/735; H04N 9/0451;
(Continued)

(56) References Cited

U.S. PATENT DOCUMENTS

| | | | |
|---|---|---|---|
| 2006/0098253 A1* | 5/2006 | Masuno | H04N 1/6027 358/518 |
| 2006/0103739 A1 | 5/2006 | Wada | |

(Continued)

FOREIGN PATENT DOCUMENTS

| | | |
|---|---|---|
| CN | 101366019 A | 2/2009 |
| CN | 102474628 A | 5/2012 |

(Continued)

OTHER PUBLICATIONS

Baek-Kyu Kim, Rae-Hong Park, "Detection and Correction of Purple Fringing Using Color Desaturation in the xy Chromaticity Diagram and the Gradient Information", Image and Vision Computing, 2010, pp. 952-964, vol. 28, Elsevier B.V.

(Continued)

*Primary Examiner* — Jose L Couso
(74) *Attorney, Agent, or Firm* — Cheng-Ju Chiang

(57) ABSTRACT

Disclosed in the present invention are an image purple fringe eliminating system, method, a computer-readable storage medium, and a photographing device. The system traverses an image, calculates a hue of a pixel, counts a ratio of purple hue to adjacent purple hue pixels in the image, and calculates a dynamic purple fringe detection threshold; creates a mask with the same size as the image acquired by an image acquisition module, and detects the pixels that fall into a purple fringe area; corrects the detected pixel falling into the purple fringe area, correcting both a red channel intensity value and a blue channel intensity value of the pixels within the purple fringe region using a green channel intensity (Continued)

value. The invention can automatically correct the purple fringe of the image, improve the image shooting quality and the user experience.

13 Claims, 2 Drawing Sheets

(58) Field of Classification Search
CPC .... H04N 9/04515; H04N 9/77; H04N 5/3572; H04N 5/217; H04N 1/58; H04N 1/62; H04N 1/646; H04N 17/002; G06T 5/009; G06T 5/006; G06T 5/003; G06T 5/10; G06T 5/20; G06T 5/005; G06T 5/008; G06T 5/50; G06T 7/90; G06T 3/4015; G06T 2207/10024; G06T 2207/30208; G06T 2207/20192; G06T 2207/30216; G06K 9/0061; G06K 9/4614; G06K 9/00261

See application file for complete search history.

(56) References Cited

U.S. PATENT DOCUMENTS

| | | | |
|---|---|---|---|
| 2007/0153341 A1 | 7/2007 | Kang | |
| 2011/0052053 A1* | 3/2011 | Tomaselli | H04N 9/77 382/167 |
| 2011/0234858 A1 | 9/2011 | Saito | |
| 2012/0218434 A1 | 8/2012 | Yeo et al. | |
| 2013/0272605 A1* | 10/2013 | Saito | H04N 9/045 382/167 |
| 2014/0307963 A1* | 10/2014 | Zimmer | G06T 3/4015 382/167 |

FOREIGN PATENT DOCUMENTS

| | | |
|---|---|---|
| CN | 103379343 A | 10/2013 |
| CN | 103440658 A | 12/2013 |
| CN | 103973997 A | 8/2014 |
| CN | 105389786 A | 3/2016 |
| CN | 105809644 A | 7/2016 |
| CN | 106251298 A | 12/2016 |
| CN | 106657946 A | 5/2017 |
| EP | 1748656 A1 | 1/2007 |

OTHER PUBLICATIONS

"HSL and HSV", Wikipedia, Dec. 21, 2016, Wikipedia, URL: https://en.wikipedia.org/w/index.php?title=HSL and HSV&oldid=756001150.

* cited by examiner

IMAGE PURPLE FRINGE ELIMINATING SYSTEM, METHOD, COMPUTER-READABLE STORAGE MEDIUM, AND PHOTOGRAPHING DEVICE

CROSS REFERENCE TO RELATED APPLICATIONS

The present application is a 35 U.S.C. § 371 National Phase conversion of International (PCT) Patent Application No. PCT/CN2018/072225, filed on Jan. 11, 2018, which claims benefit of Chinese Application No. 201710022037.8, filed on Jan. 12, 2017, the disclosure of which is incorporated by reference herein. The PCT International Patent Application was filed and published in Chinese.

FIELD OF THE INVENTION

The present invention lies in the field of image processing, and particularly relates to an image purple fringe eliminating system and method, computer-readable storage medium, and a photographing device.

BACKGROUND OF THE INVENTION

The purple fringe phenomenon occurs when we use a digital camera to photograph an image, because of the light high-contrast of the scene, dispersion easily occurs at the interface of the high luminance region and the low luminance region, the dispersion usually is purple color, and is generally called purple fringe. Purple fringe is related to the dispersion of camera lens, too narrow imaging region of CCD and the signal processing algorithm of the camera. Even a high-grade digital camera cannot completely solve the problem of purple fringe.

A first method in the field is to exchange the structures of the camera or lens to avoid the purple fringe, so as to eliminate purple fringe in image, such method has high cost and a long R&D cycle.

A second method uses a fixed threshold value to detect the purple fringe region; however, when the threshold range is large, it is very likely that the real pixel is removed, and when the threshold range is smaller, the purple fringe is likely to be missed.

The above two methods to eliminate the purple fringe both have defects, which bring great problems to the user experience. Therefore, there is an urgent need for a technology to overcome the above defects and eliminate the purple fringe phenomenon in image.

SUMMARY OF THE INVENTION

Technical Problem

The present invention aims to provide an image purple-fringe eliminating system and method, a computer-readable storage medium, and a photographing device, to avoid the complex and high-cost hard structures and a long development cycle caused by the traditional change of camera or lens structure, and to avoid the misjudgments caused by an unreasonable threshold setting, which further leads to the unreasonable correction of purple fringe.

Technical Solution

A first aspect of the present invention provides an image purple-fringe eliminating system, comprising:

an image acquisition unit, for acquiring an image;

a threshold calculation unit, for traversing the image acquired by the image acquisition unit, calculating hues of pixels, counting a ratio of pixels of purple and adjacent to purple in the image, and calculating a dynamic detection threshold value of purple fringe;

a purple fringe detection unit, for creating a mask with the same size as the image acquired by the image acquisition unit, and detecting pixels within purple fringe region;

a purple fringe correction unit, for correcting the detected pixels within the purple fringe region, correcting both a red channel intensity value and a blue channel intensity value of the pixels within the purple fringe region using a green channel intensity value; and an image output unit, for outputting a corrected image.

Further, traversing the acquired image and calculating hues of pixels, specifically comprises:

traversing the acquired image, scanning all pixels one by one, and calculating a hue of a pixel according to the following formula:

$$h = \begin{cases} 60° \times \frac{r-b}{\max - \min} + 240° & \text{if } \max = b \ \& b - g > 25 \\ 60° \times \frac{g-b}{\max - \min} + 360 & \text{if } \max = r \ \& r - g > 25 \\ 0 & \text{else} \end{cases}$$

where, h is a hue of a pixel; r, g, and b respectively represent a red channel intensity value, a green channel intensity value and a blue channel intensity value of pixels of an image, max represents the maximum intensity value of the three color channels, and min represents the minimum intensity value of the three color channels.

Further, counting a ratio of pixels of purple and adjacent to purple in the image specifically comprises:

using a preset hue threshold value range of purple and adjacent to purple, counting the total number N of pixels of purple and adjacent to purple of which the hues within the threshold value range, and calculating a ratio of the total number N of pixels of purple and adjacent to purple relative to the pixels of the whole image using the formula $$\text{ratio} = \frac{N}{\text{Size}}$$

where Size represents the size of the image.

Further, calculating a dynamic detection threshold value of purple fringe, specifically comprises:

using the formula $$\begin{cases} minPH = 195 + t*\text{ratio} \\ maxPH = 315 - t*\text{ratio} \end{cases}$$

and calculating a detection threshold value of purple fringe, where min PH, max PH represent the minimum hue threshold value and the maximum hue threshold value of purple fringe respectively, and a parameter t is 20.

Further, the purple fringe detection unit is specifically used for:

creating a mask with the same size as the image acquired by the image acquisition unit, and detecting all the pixels of which the hues higher than the minimum hue threshold value and lower than the maximum hue threshold value of the purple fringe, and calculating the purple fringe region using the formula $$mask(i, j) = \begin{cases} 255 & minPH < h < maxPH \\ 0 & else \end{cases}$$

where mask(i,j)=255 represents the pixels falling into the purple fringe region, otherwise the pixels do not fall into the purple fringe region; min PH, max PH respectively represent the minimum hue threshold value and the maximum hue threshold value of the purple fringe; thereby detecting pixels within the purple fringe region.

Further, the purple fringe correction unit corrects the red channel intensity value and the blue channel intensity value of the pixels within the purple fringe region using the formula $$\begin{cases} r_{corrected} = \lambda_r \cdot r + (1 - \lambda_r) \cdot g & 0 < \lambda_r < 1 \\ b_{corrected} = \lambda_b \cdot b + (1 - \lambda_b) \cdot g & 0 < \lambda_b < 1 \end{cases},$$

where r, g, and b represent the red channel intensity value, the green channel intensity value and the blue channel intensity value respectively; $r_{corrected}$, $b_{corrected}$ represent correction values of the red channel intensity value and the blue channel intensity value respectively; and $\lambda_r$, $\lambda_b$ represent the parameters of the red channel and the blue channel, respectively.

A second aspect of the present invention provides an image purple-fringe eliminating method, comprising steps of:
acquiring an image;
traversing the acquired image and calculating hues of pixels, counting a ratio of pixels of purple and adjacent to purple in the image, and calculating a dynamic detection threshold value of purple fringe;
creating a mask with the same size as the acquired image, and detecting pixels within purple fringe region;
correcting the detected pixels within the purple fringe region, and correcting both a red channel intensity value and a blue channel intensity value of the pixels within the purple fringe region using a green channel intensity value; and
outputting a corrected image.

Further, a step of traversing the acquired image and calculating hues of pixels, specifically comprises:
traversing the acquired image, scanning all pixels one by one, and calculating a hue of a pixel according to the following formula:

$$h = \begin{cases} 60° \times \dfrac{r-b}{max-min} + 240° & if\ max = b\ \&b - g > 25 \\ 60° \times \dfrac{g-b}{max-min} + 360 & if\ max = r\ \&r - g > 25 \\ 0 & else \end{cases}$$

where, h is a hue of a pixel; r, g, and b respectively represent a red channel intensity value, a green channel intensity value and a blue channel intensity value of pixels of an image, max represents the maximum intensity value of the three color channels, and min represents the minimum intensity value of the three color channels.

A step of counting a ratio of pixels of purple and adjacent to purple in the image, specifically comprises:
using a preset hue threshold value range of purple and adjacent to purple, counting the total number N of pixels of purple and adjacent to purple of which the hues within the threshold value range, and calculating a ratio of the total number N of pixels of purple and adjacent to purple relative to the pixels of the whole image using the formula $$ratio = \dfrac{N}{Size}$$

where Size represents the size of image.

Further, a step of calculating a dynamic detection threshold value of purple fringe, specifically comprises:
using the formula $$\begin{cases} minPH = 195 + t * ratio \\ maxPH = 315 - t * ratio \end{cases}$$

and calculating a detection threshold value of purple fringe, where min PH, max PH represent the minimum hue threshold value and the maximum hue threshold value of purple fringe respectively, and parameter t is 20.

Further, a step of creating a mask with the same size as the acquired image, and detecting pixels within purple fringe region, specifically comprises:
creating a mask with the same size as the image acquired by the image acquisition unit, and detecting all the pixels of which the hues higher than the minimum hue threshold value and lower than the maximum hue threshold value of the purple fringe, and calculating the purple fringe region using the formula $$mask(i, j) = \begin{cases} 255 & minPH < h < maxPH \\ 0 & else \end{cases}$$

Where mask(i,j)=255 represents the pixels falling into the purple fringe region, otherwise the pixels do not fall into the purple fringe region; min PH, max PH represent the minimum hue threshold value and the maximum hue threshold value of purple fringe respectively; thereby detecting pixels within the purple fringe region.

Further, a step of correcting the detected pixels within the purple fringe region, and correcting both a red channel intensity value and a blue channel intensity value of the pixels within the purple fringe region using a green channel intensity value, specifically comprises:
correcting the red channel intensity value and the blue channel intensity value of the pixels within the purple fringe region using the formula:

$$\begin{cases} r_{corrected} = \lambda_r \cdot r + (1 - \lambda_r) \cdot g & 0 < \lambda_r < 1 \\ b_{corrected} = \lambda_b \cdot b + (1 - \lambda_b) \cdot g & 0 < \lambda_b < 1 \end{cases},$$

where r, g, and b represent the red channel intensity value, the green channel intensity value and the blue channel intensity value respectively; $r_{corrected}$, $b_{corrected}$ represent correction values of the red channel intensity value and the blue channel intensity value respectively; and $\lambda r$, $\lambda_b$ represent the parameters of the red channel and the blue channel, respectively.

A third aspect of the present invention is to provide a non-transitory computer readable medium having stored thereon, a set of computer-executable instructions for causing a processor to perform the steps of the image purple-fringe eliminating method above.

A fourth aspect of the present invention is to provide a photographing device, comprising:

one or more processors; a non-transitory, computer readable memory, a display screen, and one or more computer-executable instructions; the processors are connected with the memory and display screen respectively by bus; the one or more computer-executable instructions are stored in the memory and are executable by the one or more processors to perform the steps of the image purple-fringe eliminating method above.

Advantages

The image purple fringe eliminating system and method in accordance with the embodiments of the present invention can dynamically correct purple fringe of an image, improve image quality and user experience; can avoid the complex and high-cost hard structures and a long development cycle caused by the traditional change of camera or lens structure; and can also avoid the misjudgments caused by an unreasonable threshold setting, which further leads to the unreasonable correction of purple fringe.

DETAILED DESCRIPTION OF THE INVENTION

The following is a detailed explanation of the invention in combination with the drawings and embodiments; and the embodiments are only better modes of the invention and do not limit the protection scope of the invention.

Figure 1:
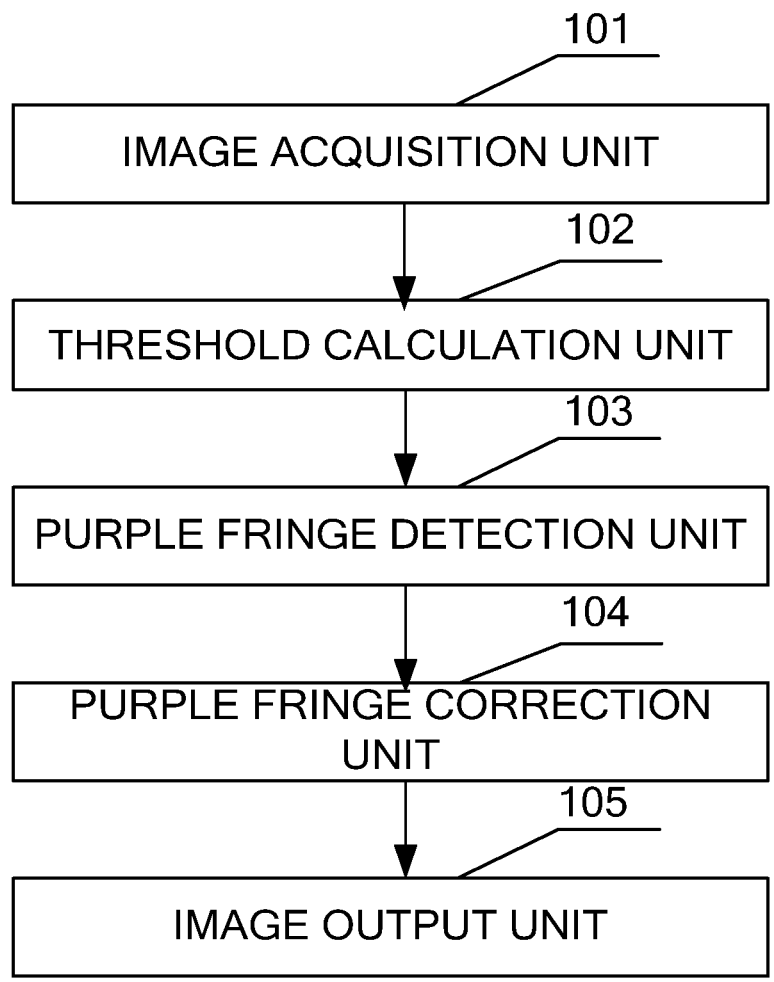
FIG. 1 is a diagram illustrating an image purple-fringe eliminating system of the present invention.

Referring to FIG. 1, which illustrates a diagram of an image purple fringe eliminating system, the system comprising an image acquisition unit 101, a threshold calculation unit 102, a purple fringe detection unit 103, a purple fringe correction unit 104, and an image output unit 105.

The image acquisition unit 101, is used for acquiring an image;

the threshold calculation unit 102, is used for traversing the image acquired by the image acquisition unit 101, calculating hues of pixels, counting a ratio of pixels of purple and adjacent to purple in the image, and calculating a dynamic detection threshold value of purple fringe.

Traversing the acquired image and calculating hues of pixels, specifically comprises:

traversing the acquired image, scanning all pixels one by one, and calculating a hue of a pixel according to the following formula 1:

$$h = \begin{cases} 60° \times \frac{r-b}{\max-\min} + 240° & \text{if } \max = b \ \& b - g > 25 \\ 60° \times \frac{g-b}{\max-\min} + 360 & \text{if } \max = r \ \& r - g > 25 \\ 0 & \text{else} \end{cases}$$

where, h is a hue of a pixel; r, g, and b respectively represent a red channel intensity value, a green channel intensity value and a blue channel intensity value of pixels of an image, max represents the maximum intensity value of the three color channels, and min represents the minimum intensity value of the three color channels.

Counting a ratio of pixels of purple and adjacent to purple in the image specifically comprises:

using a preset hue threshold value range [195-315] of purple and adjacent to purple, counting the total number N of pixels of purple and adjacent to purple of which the hues within the threshold value range, and calculating a ratio of the total number N of pixels of purple and adjacent to purple relative to the pixels of the whole image via the formula 2:

$$\text{ratio} = \frac{N}{\text{Size}}$$

where Size represents the size of the image.

Calculating a dynamic detection threshold value of purple fringe, specifically comprises:

using the formula 3:

$$\begin{cases} minPH = 195 + t * \text{ratio} \\ maxPH = 315 - t * \text{ratio} \end{cases}$$

calculating the dynamic detection threshold value of purple fringe, where min PH, max PH represent the minimum hue threshold value and the maximum hue threshold value of purple fringe respectively, and parameter t is generally 20.

The purple fringe detection unit 103, is used for creating a mask with the same size as the image acquired by the image acquisition unit, and detecting pixels within purple fringe region.

The purple fringe detection unit can be specifically used for: creating a mask with the same size as the image acquired by the image acquisition unit, and detecting all the pixels of which the hues higher than the minimum hue threshold value and lower than the maximum hue threshold value of the purple fringe, and calculating the purple fringe region using the formula 4:

$$\text{mask}(i, j) = \begin{cases} 255 & minPH < h < maxPH \\ 0 & \text{else} \end{cases}$$

where mask(i,j)=255 represents the pixels falling into the purple fringe region, otherwise the pixels do not fall into the purple fringe region; min PH, max PH respectively represent the minimum hue threshold value and the maximum hue threshold value of the purple fringe; thereby detecting pixels within the purple fringe region.

The purple fringe correction unit 104, is used for correcting the detected pixels within the purple fringe region, and correcting both a red channel intensity value and a blue channel intensity value of the pixels within the purple fringe region using a green channel intensity value.

The purple fringe correction unit corrects the red channel intensity value and the blue channel intensity value of the pixels within the purple fringe region using the formula 5:

$$\begin{cases} r_{corrected} = \lambda_r \cdot r + (1-\lambda_r) \cdot g & 0 < \lambda_r < 1 \\ b_{corrected} = \lambda_b \cdot b + (1-\lambda_b) \cdot g & 0 < \lambda_b < 1 \end{cases},$$

where r, g, and b represent the red channel intensity value, the green channel intensity value and the blue channel intensity value respectively; $r_{corrected}$, $b_{corrected}$ represent correction values of the red channel intensity value and the blue channel intensity value respectively; and $\lambda_r$, $\lambda_b$ represent the parameters of the red channel and the blue channel, respectively.

The image output unit 105, is used for outputting a corrected image.

Figure 2:
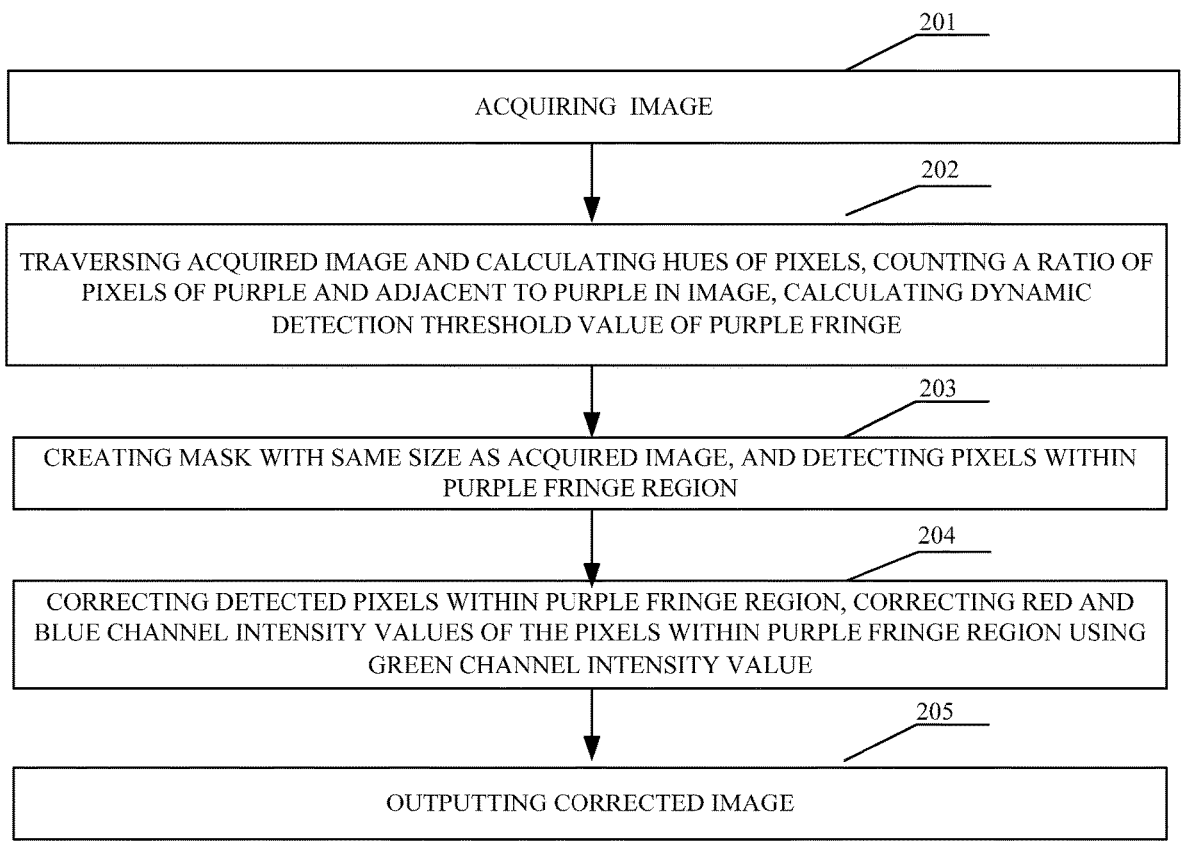
FIG. 2 is a flowchart illustrating an image purple-fringe eliminating method of the present invention.

Referring to FIG. 2, a flowchart of an image purple-fringe eliminating method is illustrated. The image purple-fringe eliminating method comprises the following steps.

Step 201, acquiring an image.

Step 202, traversing the acquired image and calculating hues of pixels, counting a ratio of pixels of purple and adjacent to purple in the image, and calculating a dynamic detection threshold value of purple fringe.

The step of traversing the acquired image and calculating hues of pixels, specifically comprises:
traversing the acquired image, scanning all pixels one by one, and calculating a hue of a pixel according to the formula 1:

$$h = \begin{cases} 60° \times \dfrac{r-b}{\max - \min} + 240° & \text{if } \max = b \ \& \ b-g > 25 \\ 60° \times \dfrac{g-b}{\max - \min} + 360 & \text{if } \max = r \ \& \ r-g > 25 \\ 0 & \text{else} \end{cases}$$

where, h is a hue of a pixel; r, g, and b respectively represent a red channel intensity value, a green channel intensity value and a blue channel intensity value of pixels of an image, max represents the maximum intensity value of the three color channels, and min represents the minimum intensity value of the three color channels.

The step of counting a ratio of pixels of purple and adjacent to purple in the image, specifically comprises:
using a preset hue threshold value range [195-315] of purple and adjacent to purple, counting the total number N of pixels of purple and adjacent to purple of which the hues within the threshold value range, and calculating a ratio of the total number N of pixels of purple and adjacent to purple relative to the pixels of the whole image via the formula 2:

$$\text{ratio} = \dfrac{N}{\text{size}}$$

where Size represents the size of the image.

The step of calculating a dynamic detection threshold value of purple fringe, specifically comprises:
using the formula 3:

$$\begin{cases} minPH = 195 + t * \text{ratio} \\ maxPH = 315 - t * \text{ratio} \end{cases}$$

calculating the dynamic detection threshold value of purple fringe, where min PH, max PH represent the minimum hue threshold value and the maximum hue threshold value of purple fringe respectively, and parameter t is generally 20.

Step 203, creating a mask with the same size as the acquired image, and detecting pixels within purple fringe region.

The step 203 specifically comprises:
creating a mask with the same size as the acquired image of step 201, and detecting all the pixels of which the hues higher than the minimum hue threshold value and lower than the maximum hue threshold value of the purple fringe, and calculating the purple fringe region using the formula 4:

$$\text{mask}(i, j) = \begin{cases} 255 & minPH < h < maxPH \\ 0 & \text{else} \end{cases}$$

where mask(i,j)=255 represents the pixels falling into the purple fringe region, otherwise the pixels do not fall into the purple fringe region; min PH, max PH respectively represent the minimum hue threshold value and the maximum hue threshold value of the purple fringe; thereby detecting pixels within the purple fringe region.

Step 204, correcting the detected pixels within the purple fringe region, correcting both a red channel intensity value and a blue channel intensity value of the pixels within the purple fringe region using a green channel intensity value.

The step 204 specifically comprises:
correcting the red channel intensity value and the blue channel intensity value of the pixels within the purple fringe region according to the formula 5:

$$\begin{cases} r_{corrected} = \lambda_r \cdot r + (1-\lambda_r) \cdot g & 0 < \lambda_r < 1 \\ b_{corrected} = \lambda_b \cdot b + (1-\lambda_b) \cdot g & 0 < \lambda_b < 1 \end{cases},$$

where r, g, and b represent the red channel intensity value, the green channel intensity value and the blue channel intensity value respectively; $r_{corrected}$, $b_{corrected}$ represent correction values of the red channel intensity value and the blue channel intensity value respectively; and $\lambda_r$, $\lambda_b$ represent the parameters of the red channel and the blue channel, respectively. Generally, $\lambda_r$, $\lambda_b$ is a relatively small number.

Step 205, outputting a corrected image.

The present invention further provides a non-transitory computer readable medium having stored thereon, a set of computer-executable instructions for causing a processor to perform the steps of the image purple-fringe eliminating method of the present invention.

The present invention further provides a photographing device, comprising:

one or more processors; a non-transitory, computer readable memory, a display screen, and one or more computer-executable instructions; the processors are connected with the memory and display screen respectively by bus; the one or more computer-executable instructions are stored in the memory and are executable by the one or more processors to perform the steps of the image purple-fringe eliminating method of the present invention.

Of the method of the present invention, all or some steps may be established into functional block diagram, and are performed by computer system under computer program instructions, and computer program instructions are stored in a non-transitory, computer readable memory.

The above mentioned is preferred embodiments of the invention and is not used to limit the invention. Although the preferred embodiments of the present disclosure have been illustrated and described above, any modification and equivalent replacement made within the spirit and principles of the invention, shall be included in the protection scope of the invention.

What is claimed is:

1. An image purple fringe eliminating method performed by a photographing device, comprising steps of:
   acquiring an image;
   traversing the acquired image and calculating hues of pixels, counting a ratio of pixels of purple and adjacent to purple in the image, and calculating a dynamic detection threshold value of purple fringe;
   creating a mask with a same size as the acquired image, and detecting pixels within a purple fringe region;
   correcting the detected pixels within the purple fringe region, and correcting both a red channel intensity value and a blue channel intensity value of the pixels within the purple fringe region using a green channel intensity value; and
   outputting a corrected image.

2. The method of claim 1, wherein a step of traversing the acquired image and calculating hues of pixels, specifically comprises:
   traversing the acquired image, scanning all pixels one by one, and calculating a hue of a pixel according to the following formula:

$$h = \begin{cases} 60° \times \frac{r-b}{max-min} + 240° & \text{if } max = b \,\&\, b-g > 25 \\ 60° \times \frac{g-b}{max-min} + 360 & \text{if } max = r \,\&\, r-g > 25 \\ 0 & \text{else} \end{cases}$$

where, h is a hue of a pixel; r, g, and b respectively represent a red channel intensity value, a green channel intensity value and a blue channel intensity value of pixels of an image, max represents a maximum intensity value of the three color channels, and min represents a minimum intensity value of the three color channels.

3. The method of claim 2, wherein a step of counting a ratio of pixels of purple and adjacent to purple in the image, specifically comprises:
   using a preset hue threshold value range of purple and adjacent to purple, counting a total number N of pixels of purple and adjacent to purple of which the hues are within the preset hue threshold value range, and calculating a ratio of the total number N of pixels of purple and adjacent to purple relative to pixels of the whole image using the formula:

$$ratio = \frac{N}{Size}$$

where Size represents a size of the image.

4. The method of claim 3, wherein a step of calculating a dynamic detection threshold value of purple fringe, specifically comprises:
   using the formula:

$$\begin{cases} minPH = 195 + t * ratio \\ maxPH = 315 - t * ratio \end{cases}$$

and calculating a detection threshold value of purple fringe, where min PH, max PH represent a minimum hue threshold value and a maximum hue threshold value of purple fringe respectively, and parameter t is 20.

5. The method of claim 4, wherein a step of creating a mask with a same size as the acquired image, and detecting pixels within a purple fringe region, specifically comprises:
   creating a mask with the same size as the acquired image, and detecting all the pixels of which the hues are higher than the minimum hue threshold value and lower than the maximum hue threshold value of the purple fringe, and calculating the purple fringe region using the formula:

$$mask(i, j) = \begin{cases} 255 & minPH < h < maxPH \\ 0 & else \end{cases}$$

where mask(i,j)=255 represents the pixels falling into the purple fringe region, otherwise the pixels do not fall into the purple fringe region; min PH, max PH represent a minimum hue threshold value and a maximum hue threshold value of purple fringe respectively; thereby detecting pixels within the purple fringe region.

6. The method of claim 1, wherein a step of correcting the detected pixels within the purple fringe region, and correcting both a red channel intensity value and a blue channel intensity value of the pixels within the purple fringe region using a green channel intensity value, specifically comprises:
   correcting the red channel intensity value and the blue channel intensity value of the pixels within the purple fringe region using the formula:

$$\begin{cases} r_{corrected} = \lambda_r \cdot r + (1 - \lambda_r) \cdot g & 0 < \lambda_r < 1 \\ b_{corrected} = \lambda_b \cdot b + (1 - \lambda_b) \cdot g & 0 < \lambda_b < 1 \end{cases},$$

where r, g, and b represent the red channel intensity value, the green channel intensity value and the blue channel intensity value respectively; $r_{corrected}$, $b_{corrected}$ represent correction values of the red channel intensity value and the blue channel intensity value respectively; and $\lambda r$, $\lambda_b$ represent parameters of the red channel and the blue channel, respectively.

7. A non-transitory computer readable medium, having stored thereon, a set of computer-executable instructions for causing one or more processors to perform steps of an image purple fringe eliminating method, comprising:
  acquiring an image;
  traversing the acquired image and calculating hues of pixels, counting a ratio of pixels of purple and adjacent to purple in the image, and calculating a dynamic detection threshold value of purple fringe;
  creating a mask with a same size as the acquired image, and detecting pixels within a purple fringe region;
  correcting the detected pixels within the purple fringe region, and correcting both a red channel intensity value and a blue channel intensity value of the pixels within the purple fringe region using a green channel intensity value; and
  outputting a corrected image.

8. A photographing device, comprising:
  one or more processors;
  a non-transitory, computer readable memory;
  a display screen; and
  one or more computer-executable instructions;
  wherein the processors are connected with the memory and display screen respectively by bus; the one or more computer-executable instructions are stored in the memory and are executable by the one or more processors to perform steps of an image purple fringe eliminating method, comprising:
  acquiring an image;
  traversing the acquired image and calculating hues of pixels, counting a ratio of pixels of purple and adjacent to purple in the image, and calculating a dynamic detection threshold value of purple fringe;
  creating a mask with a same size as the acquired image, and detecting pixels within a purple fringe region;
  correcting the detected pixels within the purple fringe region, and correcting both a red channel intensity value and a blue channel intensity value of the pixels within the purple fringe region using a green channel intensity value; and
  outputting a corrected image.

9. The device of claim 8, wherein a step of traversing the acquired image and calculating hues of pixels, specifically comprises:
  traversing the acquired image, scanning all pixels one by one, and calculating a hue of a pixel according to the following formula:

$$h = \begin{cases} 60° \times \frac{r-b}{max-min} + 240° & \text{if } max = b\ \&\ b-g > 25 \\ 60° \times \frac{g-b}{max-min} + 360 & \text{if } max = r\ \&\ r-g > 25 \\ 0 & \text{else} \end{cases}$$

where, h is a hue of a pixel; r, g, and b respectively represent a red channel intensity value, a green channel intensity value and a blue channel intensity value of pixels of an image, max represents a maximum intensity value of the three color channels, and min represents a minimum intensity value of the three color channels.

10. The method of claim 9, wherein a step of counting a ratio of pixels of purple and adjacent to purple in the image, specifically comprises:
  using a preset hue threshold value range of purple and adjacent to purple, counting a total number N of pixels of purple and adjacent to purple of which the hues are within the preset hue threshold value range, and calculating a ratio of the total number N of pixels of purple and adjacent to purple relative to pixels of the whole image using the formula:

$$\text{ratio} = \frac{N}{\text{Size}}$$

where Size represents a size of the image.

11. The method of claim 10, wherein a step of calculating a dynamic detection threshold value of purple fringe, specifically comprises:
  using the formula:

$$\begin{cases} minPH = 195 + t*\text{ratio} \\ maxPH = 315 - t*\text{ratio} \end{cases}$$

and calculating a detection threshold value of purple fringe, where min PH, max PH represent a minimum hue threshold value and a maximum hue threshold value of purple fringe respectively, and parameter t is 20.

12. The method of claim 8, wherein a step of creating a mask with a same size as the acquired image, and detecting pixels within a purple fringe region, specifically comprises:
  creating a mask with the same size as the acquired image, and detecting all pixels of which hues are higher than the minimum hue threshold value and lower than the maximum hue threshold value of the purple fringe, and calculating the purple fringe region using the formula:

$$\text{mask}(i, j) = \begin{cases} 255 & minPH < h < maxPH \\ 0 & \text{else} \end{cases}$$

where mask(i,j)=255 represents the pixels falling into the purple fringe region, otherwise the pixels do not fall into the purple fringe region; min PH, max PH represent a minimum hue threshold value and a maximum hue threshold value of purple fringe respectively; thereby detecting pixels within the purple fringe region.

13. The method of claim 8, wherein a step of correcting the detected pixels within the purple fringe region, and correcting both a red channel intensity value and a blue channel intensity value of the pixels within the purple fringe region using a green channel intensity value, specifically comprises:
  correcting the red channel intensity value and the blue channel intensity value of the pixels within the purple fringe region using the formula:

$$\begin{cases} r_{corrected} = \lambda_r \cdot r + (1-\lambda_r) \cdot g & 0 < \lambda_r < 1 \\ b_{corrected} = \lambda_b \cdot b + (1-\lambda_b) \cdot g & 0 < \lambda_b < 1 \end{cases},$$

where r, g, and b represent the red channel intensity value, the green channel intensity value and the blue channel intensity value respectively; $r_{corrected}$, $b_{corrected}$ represent correction values of the red channel intensity value and the blue channel intensity value respectively; and $\lambda r$, $\lambda_b$ represent parameters of the red channel and the blue channel, respectively.

* * * * *